US011895480B2

(12) United States Patent
Jang et al.

(10) Patent No.: US 11,895,480 B2
(45) Date of Patent: Feb. 6, 2024

(54) METHOD AND SYSTEM FOR PROCESSING OBSTACLE EFFECT IN VIRTUAL ACOUSTIC SPACE

(71) Applicant: ELECTRONICS AND TELECOMMUNICATIONS RESEARCH INSTITUTE, Daejeon (KR)

(72) Inventors: Dae Young Jang, Daejeon (KR); Kyeongok Kang, Daejeon (KR); Jae-hyoun Yoo, Daejeon (KR); Yong Ju Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 117 days.

(21) Appl. No.: 17/590,288

(22) Filed: Feb. 1, 2022

(65) Prior Publication Data

US 2022/0337968 A1 Oct. 20, 2022

(30) Foreign Application Priority Data

Apr. 20, 2021 (KR) ........................ 10-2021-0051121

(51) Int. Cl.
*H04S 7/00* (2006.01)

(52) U.S. Cl.
CPC .............. *H04S 7/302* (2013.01); *H04S 7/307* (2013.01); *H04S 2400/01* (2013.01); *H04S 2400/11* (2013.01); *H04S 2420/01* (2013.01)

(58) Field of Classification Search
CPC ...... H04S 7/302; H04S 7/307; H04S 2400/01; H04S 2400/11; H04S 2420/01
USPC .......................................................... 381/104
See application file for complete search history.

(56) References Cited

U.S. PATENT DOCUMENTS

| | | | | |
|---|---|---|---|---|
| 8,466,363 | B2 | 6/2013 | Tsuchida | |
| 2008/0240448 | A1 | 10/2008 | Gustafsson et al. | |
| 2013/0035935 | A1 | 2/2013 | Kim et al. | |
| 2015/0334502 | A1 | 11/2015 | Watanabe et al. | |
| 2019/0356999 | A1* | 11/2019 | Raghuvanshi | H04S 7/304 |
| 2019/0373395 | A1* | 12/2019 | Sarkar | H04S 7/304 |

FOREIGN PATENT DOCUMENTS

JP 5967418 A 8/2016

* cited by examiner

*Primary Examiner* — Paul Kim

(57) ABSTRACT

A method and system for processing an obstacle effect in a virtual acoustic space are disclosed. The method includes receiving a parameter for an obstacle candidate plane extracted from spatial information, determining, in response to the parameter, whether the obstacle candidate plane is an obstacle related to a path between a position of a virtual sound source and a position of a user, and applying a sound effect according to the obstacle to an audio signal when the obstacle candidate plane is the obstacle. The obstacle candidate plane is a plane of an object that may become the obstacle in a sound propagation path between the virtual sound source and the user.

8 Claims, 13 Drawing Sheets

```
<Mesh id="Occlusions" position="0 0 0" orientation="0 0 0">
    <Vertex index="0" position="0.9358 17.1271 -0.1867" />
    <Vertex index="1" position="2.03 17.1271 -0.1867" />
    <Vertex index="2" position="2.03 15 -0.1867" />
    <Vertex index="3" position="0.9358 15 -0.1867" />
    <Face index="0" vertices="0 1 3" />
    <Face index="1" vertices="1 2 3" />
</Mesh>
```

FIG. 10

```
<Mesh id="Occlusions:door1Close" position="0 0 0" orientation="0 0 0">
    <Vertex index="0" position="0.9358 17.1271 -0.1867" />
    <Vertex index="1" position="2.03 17.1271 -0.1867" />
    <Vertex index="2" position="2.03 15 -0.1867" />
    <Vertex index="3" position="0.9358 15 -0.1867" />
    <Face index="0" vertices="0 1 3" />
    <Face index="1" vertices="1 2 3" />
</Mesh>

<Update id="door1Close">
    <Modify id="mesh:Door1" position="-0.625 1.0525 2.6" />
</Update>
```

FIG. 11

```
<Mesh id="Occlusions" position="0 0 0" orientation="0 0 0">
    <Vertex index="0" position="0.9358 17.1271 -0.1867" />
    <Vertex index="1" position="2.03 17.1271 -0.1867" />
    <Vertex index="2" position="2.03 15 -0.1867" />
    <Vertex index="3" position="0.9358 15 -0.1867" />
    <Face index="0" vertices="0 1 3" material="upholstery" />
    <Face index="1" vertices="1 2 3" material="upholstery" />
</Mesh>

<AcousticMaterial id="upholstery" >
    <Frequency f="125.0" t="0.5" />
    <Frequency f="250.0" t="0.42" />
    <Frequency f="500.0" t="0.30" />
    <Frequency f="1,000.0" t="0.21" />
    <Frequency f="2,000.0" t="0.15" />
    <Frequency f="4,000.0" t="0.06" />
</AcousticMaterial>
```

FIG. 12

METHOD AND SYSTEM FOR PROCESSING OBSTACLE EFFECT IN VIRTUAL ACOUSTIC SPACE

CROSS-REFERENCE TO RELATED APPLICATION

This application claims the benefit of Korean Patent Application No. 10-2021-0051121 filed on Apr. 20, 2021, in the Korean Intellectual Property Office, the entire disclosure of which is incorporated herein by reference for all purposes.

BACKGROUND

1. Field of the Invention

One or more example embodiments relate to a method and system for processing an obstacle effect, and more specifically, to a method and system for a terminal to process an obstacle effect based on a position of a moving listener by transmitting, to the terminal, information on an object that may become an obstacle in six-degree-of-freedom (6DoF) spatial sound reproduction in a conversational immersive media field such as virtual reality and augmented reality.

2. Description of the Related Art

Recently, an immersive media field has a lot of interest in increasing a degree of freedom of a movement of a user in order to provide a more immersive virtual reality in response to advancement of virtual reality equipment.

In an environment where a mastered signal is transmitted as a specific channel sound through an existing sound content editing/production stage, and a terminal simply listens, an improvement in the degree of freedom has increased necessity for a terminal to perform sound signal processing in an editing/production stage.

Due to such a change, a 6DoF spatial sound rendering process needs to include a much more complicated process, which has resulted in a situation in which terminals capable of providing a service are greatly limited.

In 6DoF spatial sound technology, a listener listens to sound source objects present in a virtual space while moving freely in the virtual space, and thus it is important to provide a sound effect according to whether there is an obstacle between a sound source and the listener. However, as a structure of the space realistically becomes more complicated in reality, it becomes very complicated to determine whether there is the obstacle with respect to each unit plane, and it is required to repeatedly perform such an operation in response to a movement of the listener, which causes a hindrance to real-time processing in the terminal.

Accordingly, in the spatial sound technology, there is a demand for a method capable of reducing time and resources used to determine whether it is the obstacle.

SUMMARY

Example embodiments provide a method and system in which an encoder extracts and transmits a candidate plane that may become an obstacle, and a decoder determines whether it is the obstacle only with respect to the received candidate plane.

In addition, example embodiments provide a method and system for optimizing and transmitting an amount of information on an obstacle plane in a virtual reality environment in which a listener is able to freely move.

According to an aspect, there is provided a method for processing an obstacle effect, the method including receiving a parameter for an obstacle candidate plane extracted from spatial information, determining, in response to the parameter, whether the obstacle candidate plane is an obstacle related to a path between a position of a virtual sound source and a position of a user, and applying a sound effect according to the obstacle to an audio signal when the obstacle candidate plane is the obstacle. The obstacle candidate plane may be a plane of an object that may become the obstacle in a sound propagation path between the virtual sound source and the user.

The applying of the sound effect may include adjusting, in response to a preset value, a gain of a sound included in the audio signal.

The applying of the sound effect may include adjusting, in response to a transmission of the object determined as the obstacle, a gain of a sound included in the audio signal.

The applying of the sound effect may include identifying whether a diffraction path is included in the object determined as the obstacle, and applying a diffraction effect according to the diffraction path to the audio signal when the diffraction path is included.

The obstacle candidate plane may be represented by reducing information of the object. The parameter may include at least one of a unique number of the obstacle candidate plane, coordinates representing a position and a shape of the obstacle candidate plane, and transmission information of the object.

According to another aspect, there is provided a method for operating an encoder of an obstacle effect processing system, the method including receiving spatial information of a space in which a user and a virtual sound source are positioned, selecting a plane of an object that may become an obstacle in a sound propagation path between a sound source and the user from the spatial information, and extracting the plane as an obstacle candidate plane, and generating a parameter for the obstacle candidate plane, and transmitting the parameter to a decoder.

The selecting of the plane of the object from the spatial information, and the extracting of the plane as the obstacle candidate plane may include extracting, as the obstacle candidate plane, a plane of an object having a concave shape based on an orientation of a sound propagation path between the virtual sound source and the user from among objects included in the spatial information.

The selecting of the plane of the object from the spatial information, and the extracting of the plane as the obstacle candidate plane may include extracting, as the obstacle candidate plane, a plane of an object that faces the sound source from among objects included in the spatial information.

When there are a plurality of planes of an object that may become the obstacle, the selecting of the plane of the object from the spatial information, and the extracting of the plane as the obstacle candidate plane may include integrating planes of the object that are considered to be on the same plane of the object that may become the obstacle, and extracting the integrated planes as one obstacle candidate plane. The generating of the parameter for the obstacle candidate plane, and the transmitting of the parameter to the decoder may include generating a parameter including material and transmission information of each of objects that may become the obstacle.

The decoder may be configured to determine, in response to the parameter, whether the obstacle candidate plane is an obstacle related to a path between a position of the sound source and a position of the user, and apply a sound effect according to the obstacle to an audio signal when the obstacle candidate plane is the obstacle.

According to still another aspect, there is provided a decoder of an obstacle effect processing system, the decoder including an obstacle plane search unit configured to receive a parameter for an obstacle candidate plane extracted from spatial information, and determine, in response to the parameter, whether the obstacle candidate plane is an obstacle related to a path between a position of a virtual sound source and a position of a user, and an obstacle effect processor configured to apply a sound effect according to the obstacle to an audio signal when the obstacle candidate plane is the obstacle. The obstacle candidate plane may be a plane of an object that may become the obstacle in a sound propagation path between the virtual sound source and the user.

The obstacle effect processor may be configured to adjust, in response to a preset value, a gain of a sound included in the audio signal.

The obstacle effect processor may be configured to adjust, in response to a transmission of the object determined as the obstacle, a gain of a sound included in the audio signal.

The obstacle effect processor may be configured to identify whether a diffraction path is included in the object determined as the obstacle, and apply a diffraction effect according to the diffraction path to the audio signal when the diffraction path is included.

The obstacle candidate plane may be represented by reducing information of the object. The parameter may include at least one of a unique number of the obstacle candidate plane, coordinates representing a position and a shape of the obstacle candidate plane, and transmission information of the object.

According to still another aspect, there is provided an encoder of an obstacle effect processing system, the encoder including a spatial information receiver configured to receive spatial information of a space in which a user and a virtual sound source are positioned, a candidate plane extractor configured to select a plane of an object that may become an obstacle in a sound propagation path between a sound source and the user from the spatial information, and extract the plane as an obstacle candidate plane, and a parameter generator configured to generate a parameter for the obstacle candidate plane, and transmit the parameter to a decoder.

The candidate plane extractor may be configured to extract, as the obstacle candidate plane, a plane of an object having a concave shape based on an orientation of a sound propagation path between the virtual sound source and the user from among objects included in the spatial information.

The candidate plane extractor may be configured to extract, as the obstacle candidate plane, a plane of an object that faces the sound source from among objects included in the spatial information.

When there are a plurality of planes of an object that may become the obstacle, the candidate plane extractor may be configured to integrate the planes of the object that may become the obstacle, and extract the integrated planes as one obstacle candidate plane. The parameter generator may be configured to generate a parameter including material and transmission information of each of objects that may become the obstacle.

Additional aspects of example embodiments will be set forth in part in the description which follows and, in part, will be apparent from the description, or may be learned by practice of the disclosure.

According to example embodiments, an encoder may extract and transmit a candidate plane that may become an obstacle, and a decoder may determine whether it is the obstacle only with respect to the received candidate plane, thereby reducing time and resources used to determine whether it is the obstacle.

In addition, according to example embodiments, it is possible to optimize and transmit an amount of information on an obstacle plane in a virtual reality environment in which a listener is able to freely move, thereby minimizing resources required to transmit information and calculations required to process information.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 10 is an example of XML syntax representing obstacle plane information according to an example embodiment;

FIG. 11 is an example of XML syntax representing change information when an obstacle plane position is changed in an example embodiment;

FIG. 12 is an example of XML syntax representing a material of an obstacle plane and a transmission of the material according to an example embodiment;

DETAILED DESCRIPTION

Figure 1:
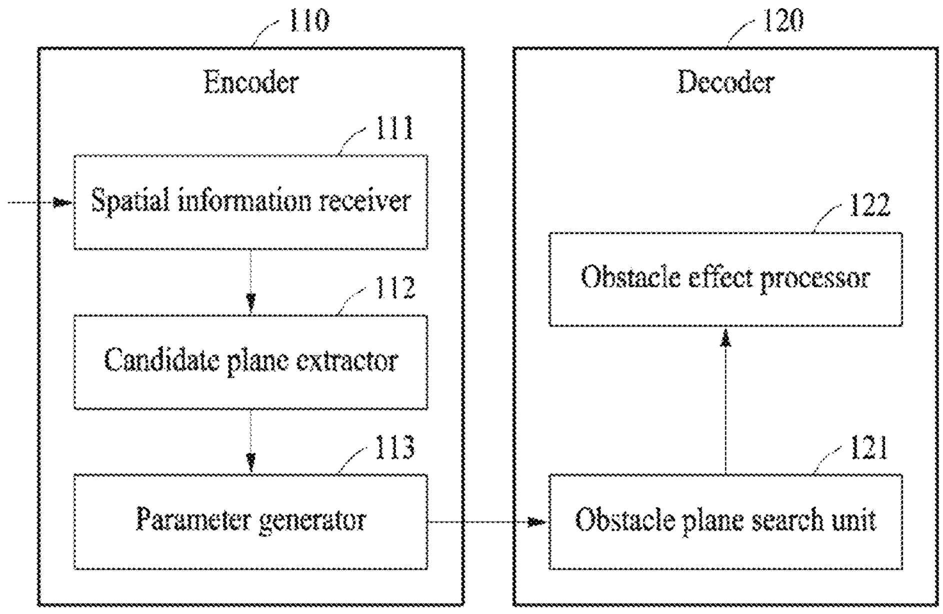
FIG. 1 is a diagram illustrating an obstacle effect processing system according to an example embodiment.

Hereinafter, example embodiments are described in detail with reference to the accompanying drawings. Various modifications may be made to the example embodiments.

Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms “a,” “an,” and “the” are intended to include the plural forms as well, unless the context clearly indicates otherwise. As used herein, the term “and/or” includes any one and any combination of any two or more of the associated listed items. It will be further understood that the terms “comprises” and/or “comprising,” when used in this specification, specify the presence of stated features, integers, steps, operations, elements, components or a combination thereof, but do not preclude the presence or addition of one or more other features, integers, steps, operations, elements, components, and/or groups thereof.

When describing the example embodiments with reference to the accompanying drawings, like reference numerals refer to like components and a repeated description related thereto will be omitted. When describing the example embodiments, detailed description of well-known related structures or functions will be omitted when it is deemed that such description will cause ambiguous interpretation of the example embodiments.

FIG. 1 is a diagram illustrating an obstacle effect processing system according to an example embodiment.

The obstacle effect processing system may include an encoder 110 and a decoder 120, as illustrated in FIG. 1. In this case, the encoder 110 may be included in a sound source providing device, and the decoder 120 may be included in a terminal of a user.

The encoder 110 may encode an audio signal, transmit the encoded audio signal and a parameter of an obstacle candidate plane, and include a spatial information receiver 111, a candidate plane extractor 112, and a parameter generator 113. In this case, the spatial information receiver 111, the candidate plane extractor 112, and the parameter generator 113 may be different processors or respective modules included in a program executed by one processor.

The spatial information receiver 111 may receive spatial information of a space in which the user and a virtual sound source are positioned. In this case, the spatial information may include at least one of a structure of the space in which the user and the virtual sound source are positioned, coordinate information of a sound source, and material information of each surface representing an acoustic characteristic. For example, the spatial information may be an encoder input format (EIF) file used for proposal and evaluation of a technology in MPEG-I audio.

The candidate plane extractor 112 may select a plane of an object that may become an obstacle in a sound propagation path between the sound source and the user from the spatial information received by the spatial information receiver 111, and extract the plane as an obstacle candidate plane. In this case, the obstacle candidate plane may be represented by reducing information of the object.

In this case, the candidate plane extractor 112 may extract, as the obstacle candidate plane, a plane of an object having a concave shape in an orientation of a sound propagation path between the virtual sound source and the user from among objects included in the spatial information. In addition, the candidate plane extractor 112 may extract, as the obstacle candidate plane, a plane of an object that faces the sound source from among objects included in the spatial information. In addition, when there are a plurality of planes of an object that may become the obstacle, the candidate plane extractor 112 may integrate the planes of the object that may become the obstacle, and extract the integrated planes as one obstacle candidate plane.

The parameter generator 113 may generate a parameter for the obstacle candidate plane extracted by the candidate plane extractor 112, and transmit the parameter to the decoder 120. In this case, the parameter generator 113 may generate a parameter including material and transmission information of each of objects that may become the obstacle. For example, the parameter may include at least one of a unique number of the obstacle candidate plane, coordinates representing a position and a shape of the obstacle candidate plane, transmission information of an object, and diffraction path information.

The decoder 120 may decode the received audio signal, determine, in response to the parameter, whether it is the obstacle by restoring the obstacle candidate plane, and apply a sound effect according to the obstacle to the audio signal in response to a result of the determination. The decoder 120 may include an obstacle plane search unit 121 and an obstacle effect processor 122, as illustrated in FIG. 1. In this case, the obstacle plane search unit 121 and the obstacle effect processor 122 may be different processors or respective modules included in a program executed by one processor.

The obstacle plane search unit 121 may receive, from the encoder, a parameter for the obstacle candidate plane. In addition, the obstacle plane search unit 121 may determine whether the obstacle candidate plane is an obstacle related to a path between a position of the virtual sound source and a position of the user in response to the received parameter.

When it is determined that the obstacle candidate plane is the obstacle, the obstacle effect processor 122 may apply the sound effect according to the obstacle to the decoded audio signal.

In this case, the obstacle effect processor 122 may process an obstacle effect through one of a method for processing the obstacle effect considering only whether it is the obstacle, a method for processing the obstacle effect by applying an obstacle transmission, and a method for processing the obstacle effect by applying the obstacle transmission and diffraction. The obstacle effect processor 122 may process the obstacle effect, considering only whether it is the obstacle. When there is the obstacle between the sound source and a listener, the obstacle effect processor 122 may adjust, in response to a preset value, a gain of a sound included in the audio signal.

When the obstacle effect processor 122 processes the obstacle effect by applying the obstacle transmission, the obstacle effect processor 122 may adjust, in response to a transmission of the object determined as the obstacle, the gain of the sound included in the audio signal. For example, the obstacle effect processor 122 may adjust the gain as a sum of transmissions of a plurality of obstacles between the sound source and the listener.

When the obstacle effect processor 122 processes the obstacle effect by applying the obstacle transmission and diffraction, the obstacle effect processor 122 may identify whether a diffraction path is included in the object determined as the obstacle. In addition, when the diffraction path is included, the obstacle effect processor 122 may apply a diffraction effect according to the diffraction path to the audio signal.

In order to search for the obstacle between the sound source and the listener in a virtual reality environment, it may be required to determine whether many unit planes (triangular planes) that form a space and a straight path between the sound source and the listener intersect. However, the number of the planes that form the space may be generally tens of thousands or more depending on a modeling resolution of the space, and a complicated process of having to determine whether it is the obstacle a dozen times or more per second in response to movements of the sound source and the listener may be included.

In the obstacle effect processing system, an encoder may extract and transmit a candidate plane that may become the obstacle, and a decoder may determine whether it is the obstacle only with respect to the received candidate plane, thereby reducing time and resources used to determine whether it is the obstacle.

Figure 2:
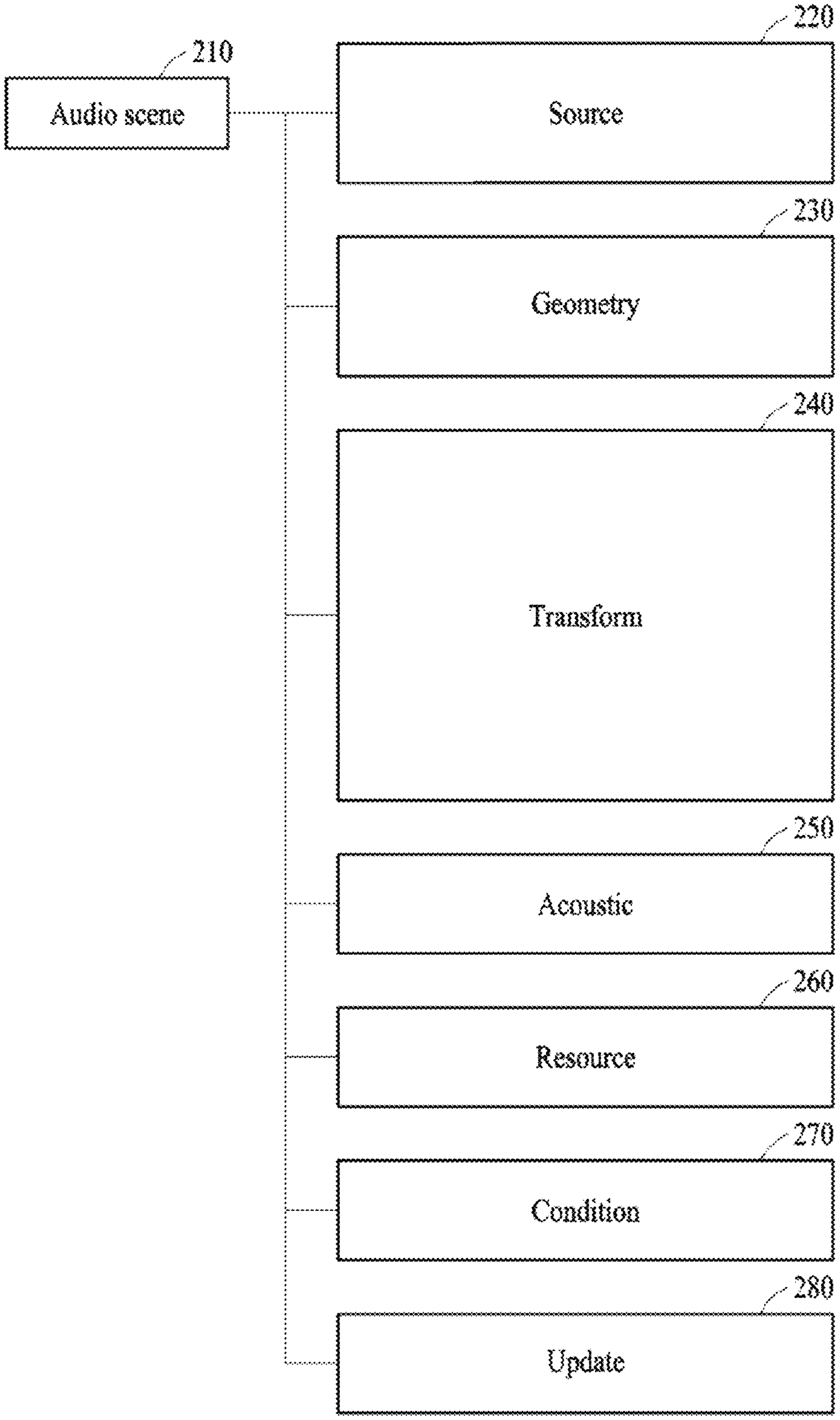
FIG. 2 is a diagram illustrating a structure of an MPEG-I audio EIF file according to an example embodiment.

In addition, the obstacle effect processing system may optimize and transmit an amount of information on an obstacle plane in the virtual reality environment where the listener is able to move freely, thereby providing an effect on obstruction of sound propagation caused by the obstacle, which is one of the most important effects in the virtual reality environment, to effectively simulate a sound effect in a three-dimensional space caused by the obstacle. FIG. 2 is a diagram illustrating a structure of an MPEG-I audio EIF file according to an example embodiment.

As illustrated in FIG. 2, an EIF file used as spatial information may include an audio scene 210, a source 220, a geometry 230, a transform 240, an acoustic 250, a resource 260, a condition 270, and an update 280.

Figure 3:
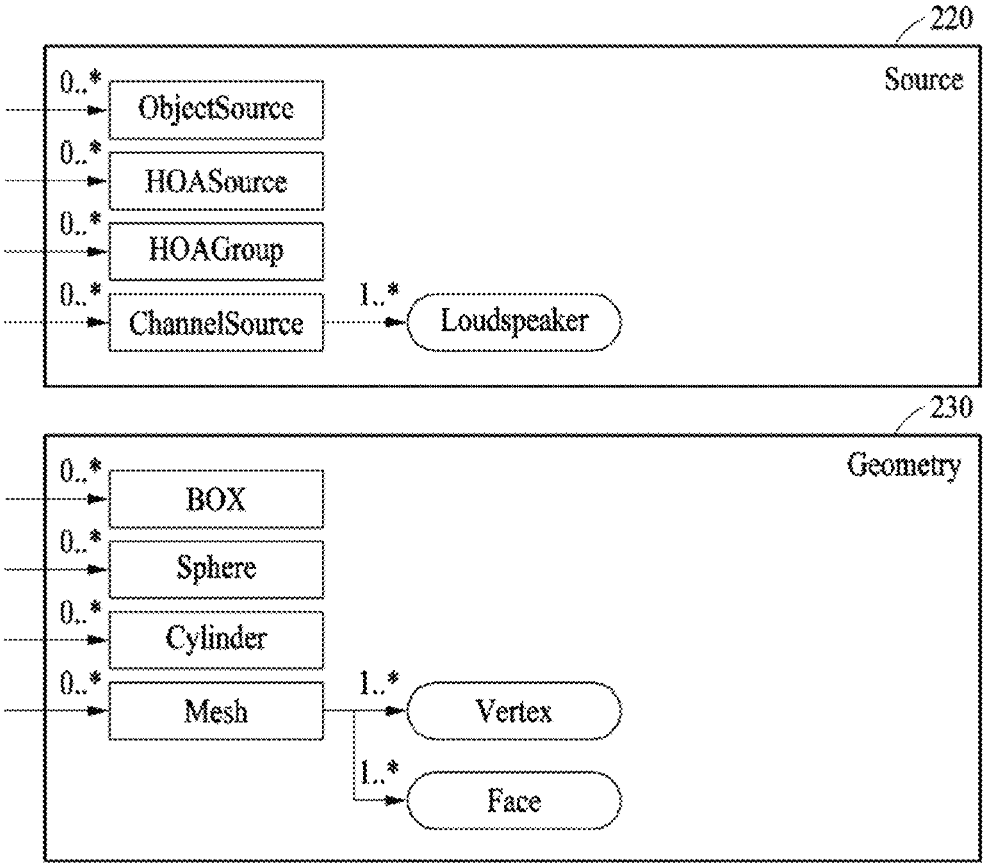
FIG. 3 is a diagram illustrating a detailed structure of the source and geometry illustrated in FIG. 2.

In addition, the source 220 may include “ObjectSource,” “HOASource,” “HOAGroup,” “ChannelSource,” and “Loudspeaker,” as illustrated in FIG. 3. The geometry 230 may include “BOX,” “Sphere,” “Cylinder,” “Mesh,” “Vertex,” and “Face,” as illustrated in FIG. 3.

Figure 4:
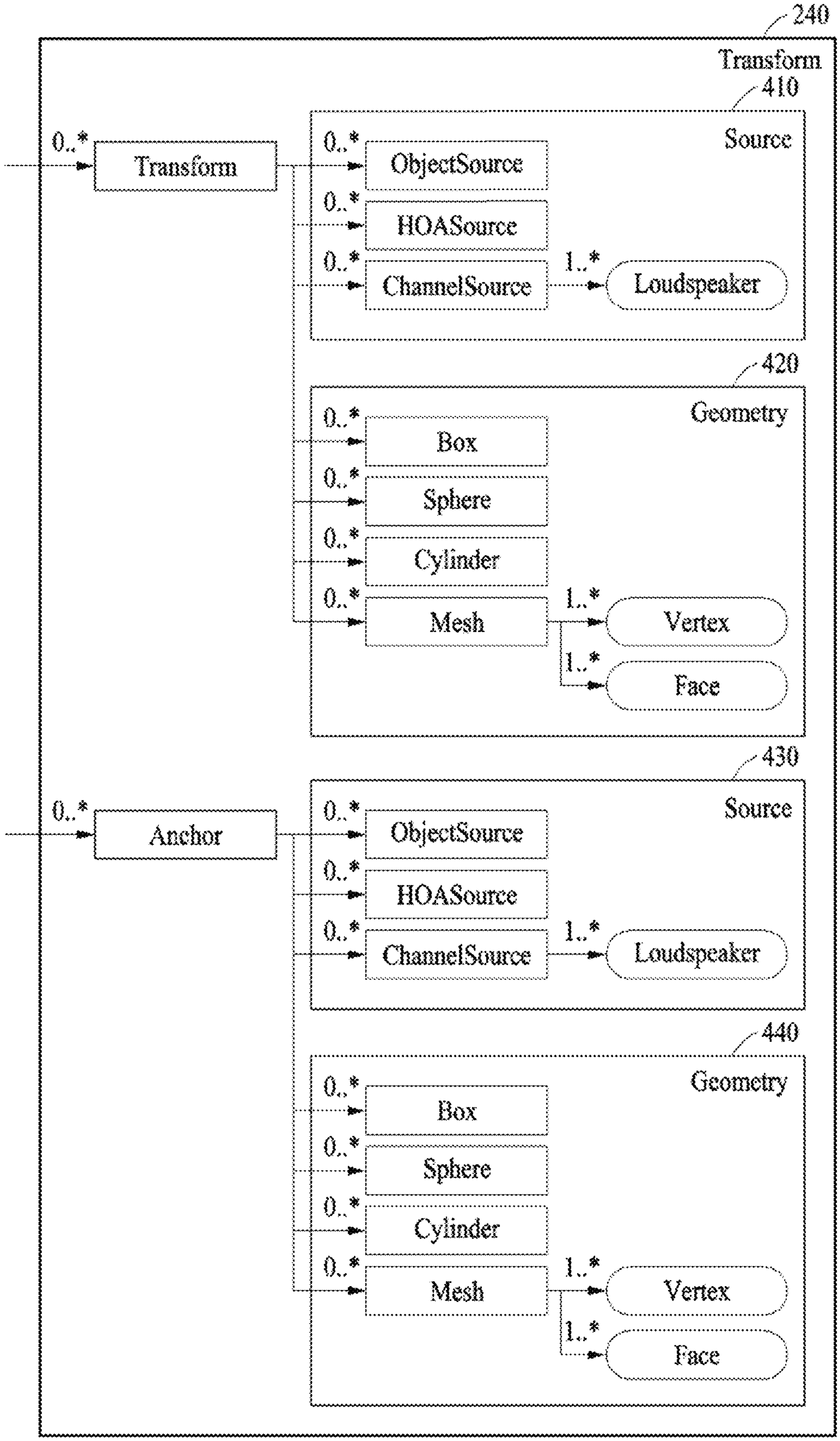
FIG. 4 is a diagram illustrating a detailed structure of the transform illustrated in FIG. 2.

In addition, the transform 240 may include a source 410 connected to “Transform,” a geometry 420, a source 430 connected to “Anchor,” and a geometry 440, as illustrated in FIG. 4. In this case, the source 410 and the source 430 may include the same information as that of the source 220 illustrated in FIG. 3. The geometry 420 and the geometry 440 may include the same information as that of the geometry 230 illustrated in FIG. 3.

Figure 5:
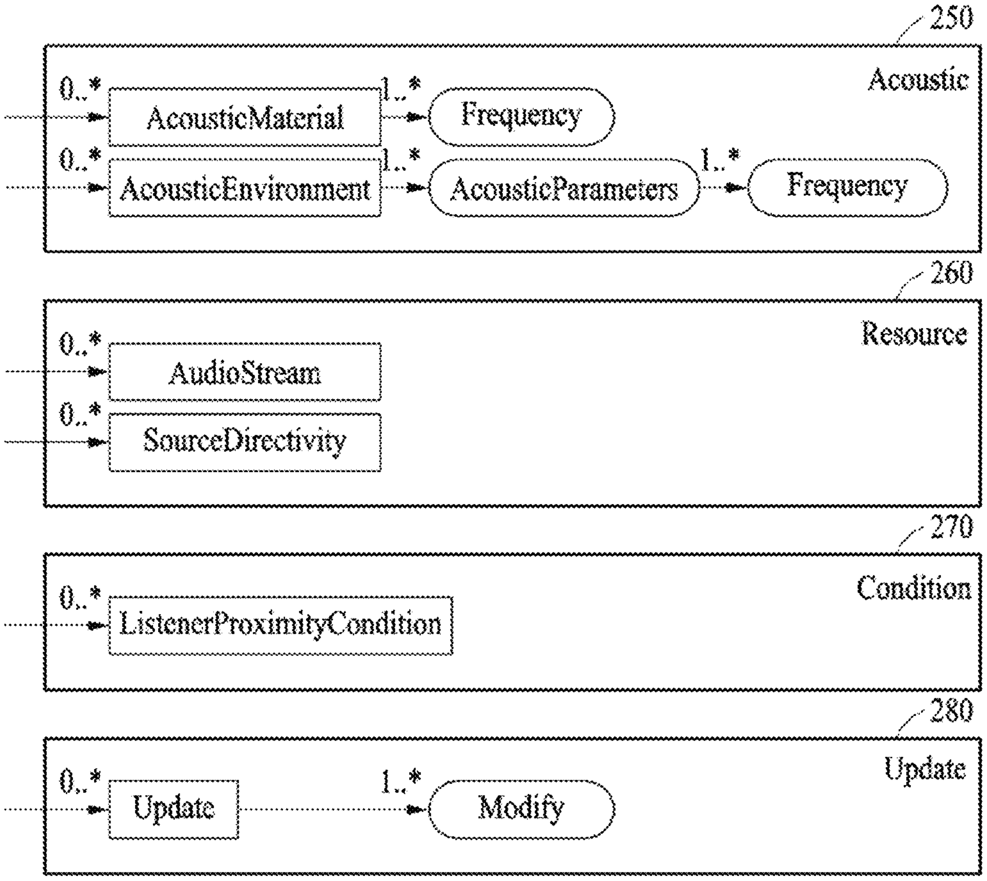
FIG. 5 is a diagram illustrating a detailed structure of the acoustic, resource, condition, and update illustrated in FIG. 2.

In addition, as illustrated in FIG. 5, the acoustic 250 may include “AcousticMaterial,” “Frequency,” “AcousticEnvironment,” “AcousticParameters,” and “Frequency”. The resource 260 may include “AudioStream” and “SourceDirectivity,” as illustrated in FIG. 5. The condition 270 may include “ListenerProximityCondition,” and the update 280 may include “Update” and “Modify”.

Figure 6:
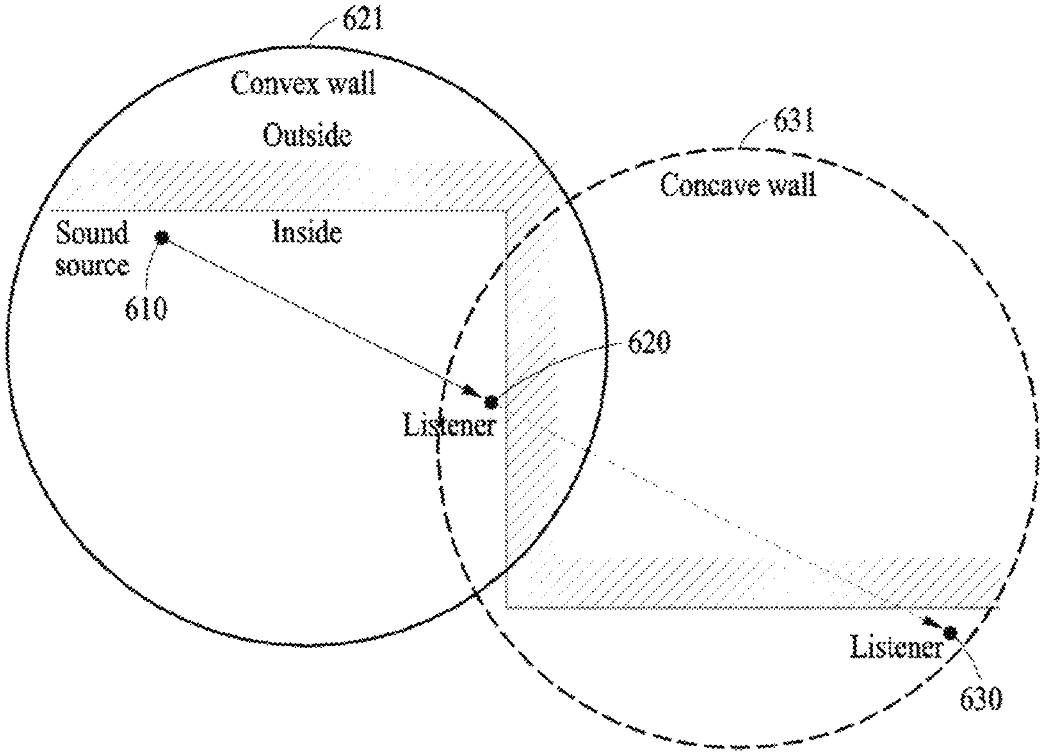
FIG. 6 is a diagram illustrating a concept of a convex wall and a concave wall positioned in an acoustic space.

FIG. 6 is a diagram illustrating a concept of a convex wall and a concave wall positioned in an acoustic space.

The candidate plane extractor 112 may analyze, in response to spatial information, a structure of a space in which a user and a virtual sound source are positioned. In this case, the candidate plane extractor 112 may select, in response to a result of the analysis, a plane that may become an obstacle in a path between a sound source and a listener considering a position and a movement range of the sound source and the listener within an entire boundary of the space.

Among objects positioned in the space, an object likely to become the obstacle may be an object having a concave shape in an orientation of a sound propagation path.

A convex wall 621 based on an orientation of a sound propagation path between a sound source 610 and a listener (user) 620 may not be an obstacle caused by a wall on the sound propagation path, as illustrated in FIG. 6.

Conversely, a concave wall 631 based on the orientation of the sound propagation path between the sound source 610 and the listener (user) 630 may be the obstacle by allowing a space to be isolated by a wall concavely protruding on the sound propagation path, as illustrated in FIG. 6.

In addition, when a plane of the space is represented, a front surface and a back surface of the plane may be distinguished. Accordingly, when a plane of an object faces the sound source 610, the object may be likely to be positioned between the user and the sound source 610, and thus may become the obstacle. Conversely, when the plane of the object faces away from the sound source 610, the object may be positioned on an opposite side of the user based on the sound source 610, and thus the plane may not be likely to become the obstacle. Accordingly, the candidate plane extractor 112 may extract, as an obstacle candidate plane, the plane of the object that faces the sound source 610 from among objects included in the spatial information.

When the obstacle effect processor 122 processes an obstacle effect considering only whether it is the obstacle, the candidate plane extractor 112 may reduce the number of obstacle candidates the most. Specifically, when a plurality of planes simultaneously act as obstacles, the candidate plane extractor 112 may leave only one obstacle candidate, and may integrate planes with different materials on the same plane into one plane and extract the one plane.

When the obstacle effect processor 122 processes the obstacle effect by applying an obstacle transmission, the candidate plane extractor 112 may extract a plane with a different material as another plane, and the parameter generator 113 may use a property of the obstacle candidate plane to generate a parameter including a type of material of each of planes and transmission information according to the type.

When the obstacle effect processor 122 processes the obstacle effect by applying the obstacle transmission and diffraction, the candidate plane extractor 112 may extract a plane with a different material as another plane, and the parameter generator 113 may use the property of the obstacle candidate plane to generate a parameter including a type of material of each of planes and transmission information according to the type. In this case, the parameter generator 113 may additionally incorporate, into the parameter, information on an open edge that does not come into contact with the other plane among edges of an obstacle plane so as to process a diffraction effect.

Figure 7:
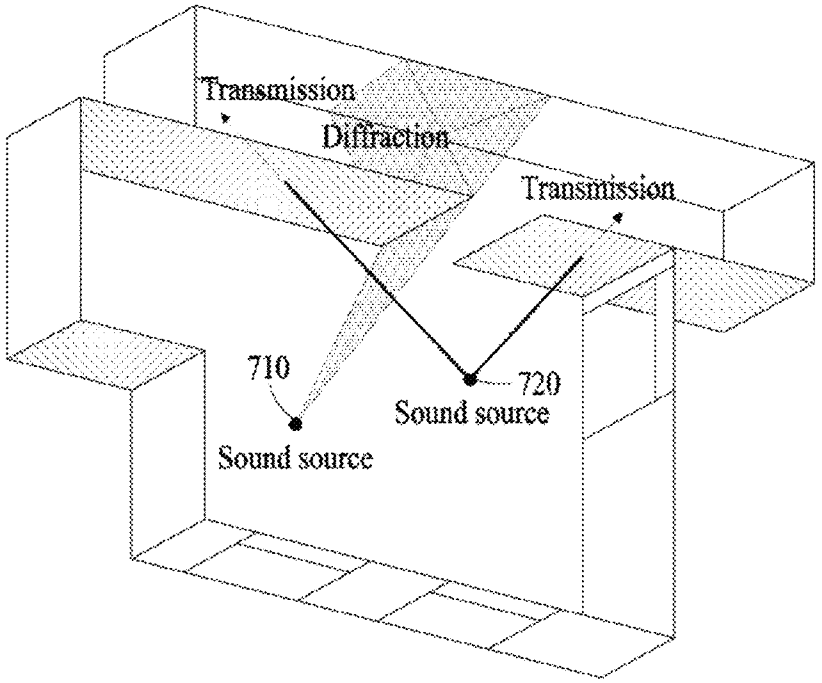
FIG. 7 is a diagram illustrating a concept of transmission of an arbitrary space and a diffraction effect.

FIG. 7 is a diagram illustrating a concept of transmission of an arbitrary space and a diffraction effect.

A space in which virtual sound sources are positioned may be a room-shaped space connected to a hallway as illustrated in FIG. 7, and acoustic energy corresponding to an audio signal may be radiated from the virtual sound sources. In this case, acoustic energy radiated from a sound source 710 may be diffracted as illustrated in FIG. 7, and acoustic energy radiated from a sound source 720 may pass through an obstacle as illustrated in FIG. 7. In FIG. 7, in order to display progress of acoustic energy according to diffraction and transmission, only one of diffraction and transmission may be applied to the acoustic energy respectively radiated from the sound source 710 and the sound source 720. However, in an actual example embodiment, both diffraction and transmission may be applied to acoustic energy emitted from one sound source.

Figure 8:
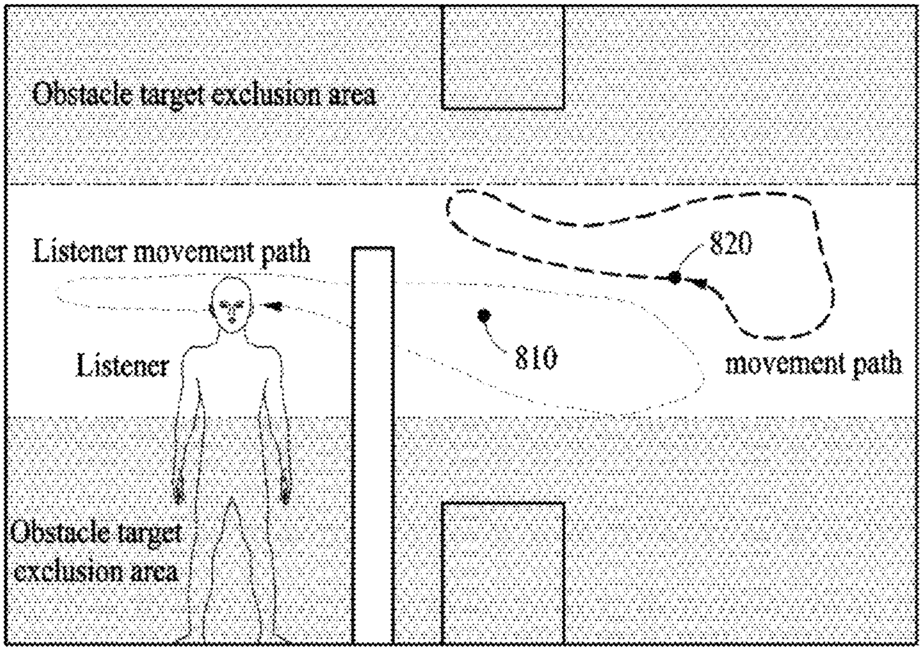
FIG. 8 is a diagram illustrating a range of an obstacle candidate plane that is possible in response to movement ranges of a sound source and a listener.

FIG. 8 is a diagram illustrating a range of an obstacle candidate plane that is possible in response to movement ranges of a sound source and a listener.

The obstacle plane search unit 121 may determine that an object having a plane with a size smaller than a preset size or a thickness smaller than a preset thickness among objects positioned between a user and a fixed sound source 810 is not an obstacle.

In addition, the obstacle plane search unit 121 may determine, in response to movement ranges of a moving sound source 820 and a listener (user), that a range in which a straight path between the moving sound source 820 and the listener (user) is not formed is an obstacle target exclusion area. For example, as illustrated in FIG. 8, the obstacle target exclusion area may include a plane that is always lower or higher than a straight path between the fixed sound source 810 or the moving sound source 820 and the listener (user), and a plane that faces away from a sound source.

Figure 9:
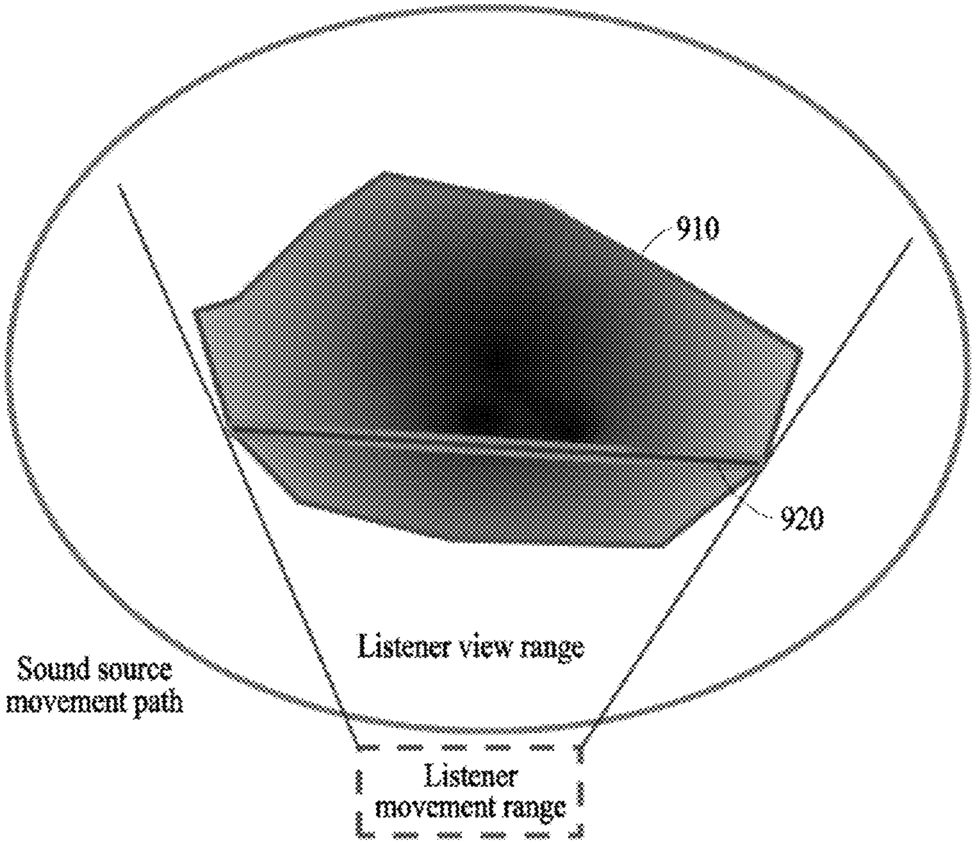
FIG. 9 is a diagram illustrating a method for reducing obstacle information according to an example embodiment.

FIG. 9 is a diagram illustrating a method for reducing obstacle information according to an example embodiment.

A movement path of a user may be irregular. However, a range in which the user is able to move may be limited. For example, the user may move freely in a space (room) in which a sound source is reproduced (an irregular movement path). However, the range in which the user is able to move may be limited to a room. Accordingly, an obstacle effect processing system may use various obstacle information reduction methods with a movement range of the user. For example, as illustrated in FIG. 9, a sound source moving in a wide outdoor space may move around an obstacle 910 having a complicated shape, and a listener (user) may be in a state of being able to move only in a partial area of the space.

In this case, a rear surface of the obstacle 910 may not be visually recognized at a position of the listener (user), and only a plane 920 corresponding to a front surface of the obstacle 910 may be visually recognized. That is, even when the obstacle 910 is reduced only to the plane 920 and displayed, the obstacle 910 may be recognized in the same manner by the listener (user).

Accordingly, the encoder 110 of the obstacle effect processing system may reduce information on the obstacle 910 by extracting the obstacle plane 920 from the obstacle 910. In this case, the encoder 110 of the obstacle effect processing system may include information required to process an obstacle effect, such as a unique number of the obstacle plane 920, coordinates representing a position and a shape of the obstacle plane 920, and transmission information of the obstacle 910, and may package the information into a parameter.

In addition, the unique number of the obstacle plane 920 may be represented as a series of numbers or unique characters, and coordinate information of the obstacle plane 920 may be represented as face information representing an arrangement of vertices having an order according to coordinates and orientations of x, y, and z axes of a vertex representing each vertex of a triangular plane. In this case, when a transmission is applied, the face information may include material information of the obstacle 910.

FIG. 10 is an example in which obstacle plane information is represented as an XML document of an EIF file for MPEG-I audio standardization according to an example embodiment.

In this case, a mesh may include a set of triangular planes, may be information that may represent one physical object, and may add origin coordinates of relative coordinates and rotation information.

In addition, rotation may be represented in various coordinate systems, and may be represented in a cartesian coordinate system that is used in OpenGL and that represents rotations of the x, y, and z axes, and a spherical coordinate system that represents an orientation in terms of a horizontal angle, a vertical angle, and a distance, and may be represented in terms of yaw, pitch, and roll angles.

FIG. 11 is an example of XML syntax representing change information when an obstacle plane position is changed in an example embodiment.

In some cases, when a position of an obstacle plane is changed, an obstacle effect processing system may set a flag to receive and process currently changed position information of the obstacle plane from an upper system.

In this case, as illustrated in FIG. 11, the obstacle effect processing system may incorporate a flag of a change event for a position change of a plane into a unique number of a mesh, so that information on a changed position of the current mesh may be referred to by a state of the flag.

That is, when a door (mesh:Door1) is an obstacle, a state in which the door is closed may be checked with a flag based on a state in which the door is opened, and whether it is the obstacle may be determined using information on a changed position of mesh:Door1 in the state in which the door is closed.

FIG. 12 is an example of XML syntax representing a material of an obstacle plane and a transmission of the material according to an example embodiment.

When a transmission of an obstacle is applied, an obstacle effect processing system may incorporate material information of a plane into an obstacle plane face as illustrated in FIG. 12, and a transmission according to the material may be separately defined with respect to a frequency band. In this case, a t element may represent a transmission.

Figure 13:
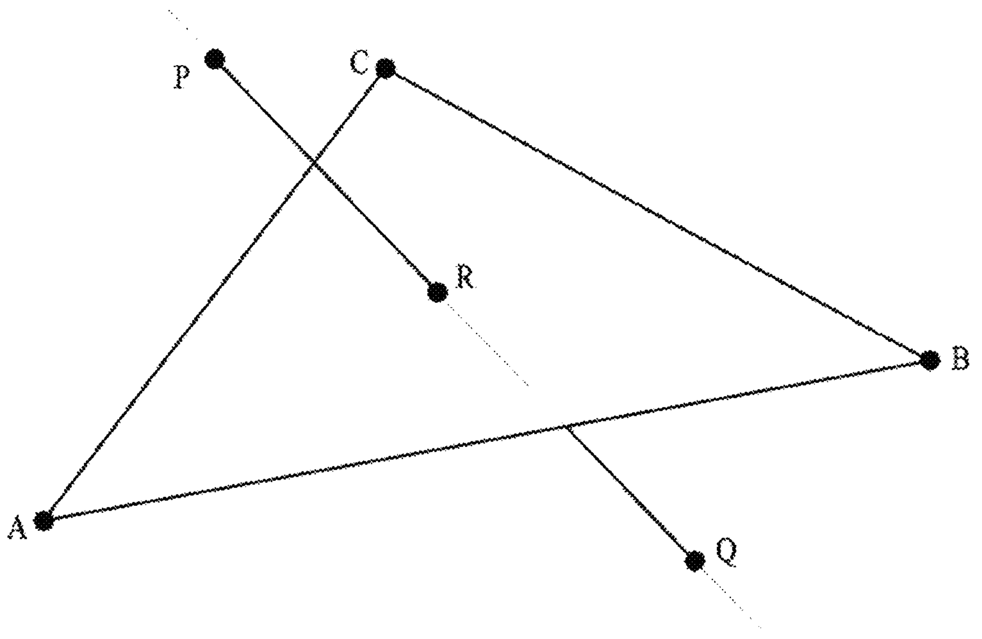
FIG. 13 is an example of a method for searching whether an obstacle plane becomes an obstacle in a path between an actual sound source and a listener, and a pseudo code of the method according to an example embodiment.

FIG. 13 is an example of a method for searching whether an obstacle plane becomes an obstacle in a path between an actual sound source and a listener, and a pseudo code of the method according to an example embodiment.

The decoder 120 of an obstacle effect processing system may use received obstacle plane information to search whether the obstacle plane becomes the obstacle with respect to a straight path formed by a position of a current sound source (or image sound source) and a position of the listener.

In this case, as illustrated in FIG. 13, the decoder 120 may analyze, with respect to a unit triangular plane, a relationship between respective lines that form the plane and a straight path between a sound source P and a listener Q, and may determine that the unit triangular plane becomes the obstacle when a P-Q line is inside all lines of the triangular plane.

For example, the decoder 120 may determine whether it is the obstacle, and calculate coordinates of a contact point R when it is determined there is the obstacle, using the following pseudo code.

```
//Given line pq and xxw triangle abc, return whether line pierces triangle. If
//so, also return the barycentric coordinates (u, v, w) of the intersection point
Int IntersectLineTriangle(Point p, Point q, Point a, Point b, Point c,
    float &u, float &v, float &w)
{
  Vector pq = q − p;
  Vector pa = a − p;
  Vector pb = b − p;
  Vector pc = c − p;
  // Test if pq is inside the edges bc, ca and ab. Done by testing
  // that the signed tetrahedral volumes, computed using scalar triple
  // products, are all positive
  u = SchlarTriple(pq, pc, pb);
  if (u < 0.0f) return 0;
  v = SchlarTriple(pq, pa, pc);
  if (v < 0.0f) return 0;
  w = SchlarTriple(pq, pb, pa);
  if (w < 0.0f) return 0;
  // compute the barycentric coordinates (u, v, w) determining the
  // intersection point r, r = u*a +v*b = w*c
  float denom = 10.f / (u + v + w);
  u *= denom;
  v *= denom;
```

-continued

```
    w *= denom;    // w = 1.0f − u − v;
    return 1;
}
```

In this case, a scalar triple product operation may be calculated by Equation 1.

$$u\cdot v\times w = u\times v\cdot w = \begin{vmatrix} u_1 & u_2 & u_3 \\ v_1 & v_2 & v_3 \\ w_1 & w_2 & w_3 \end{vmatrix} \quad \text{[Equation 1]}$$

In this case, a dot product of Equation 1 may be represented by Equation 2.

$$u\cdot v=(u_1,u_2,u_3)\cdot(v_1,v_2,v_3)=u_1*v_1+u_2*v_2+u_3*v_3 \quad \text{[Equation 2]}$$

In addition, a cross product of Equation 1 may be represented by Equation 3.

$$u\times v=(u_1,u_2,u_3)\times(v_1,v_2,v_3)=[u_2*v_3-u_3*v_2,-(u_1*v_3-u_3*v),u_1*v_2-u_2*v_1] \quad \text{[Equation 3]}$$

Figure 14:
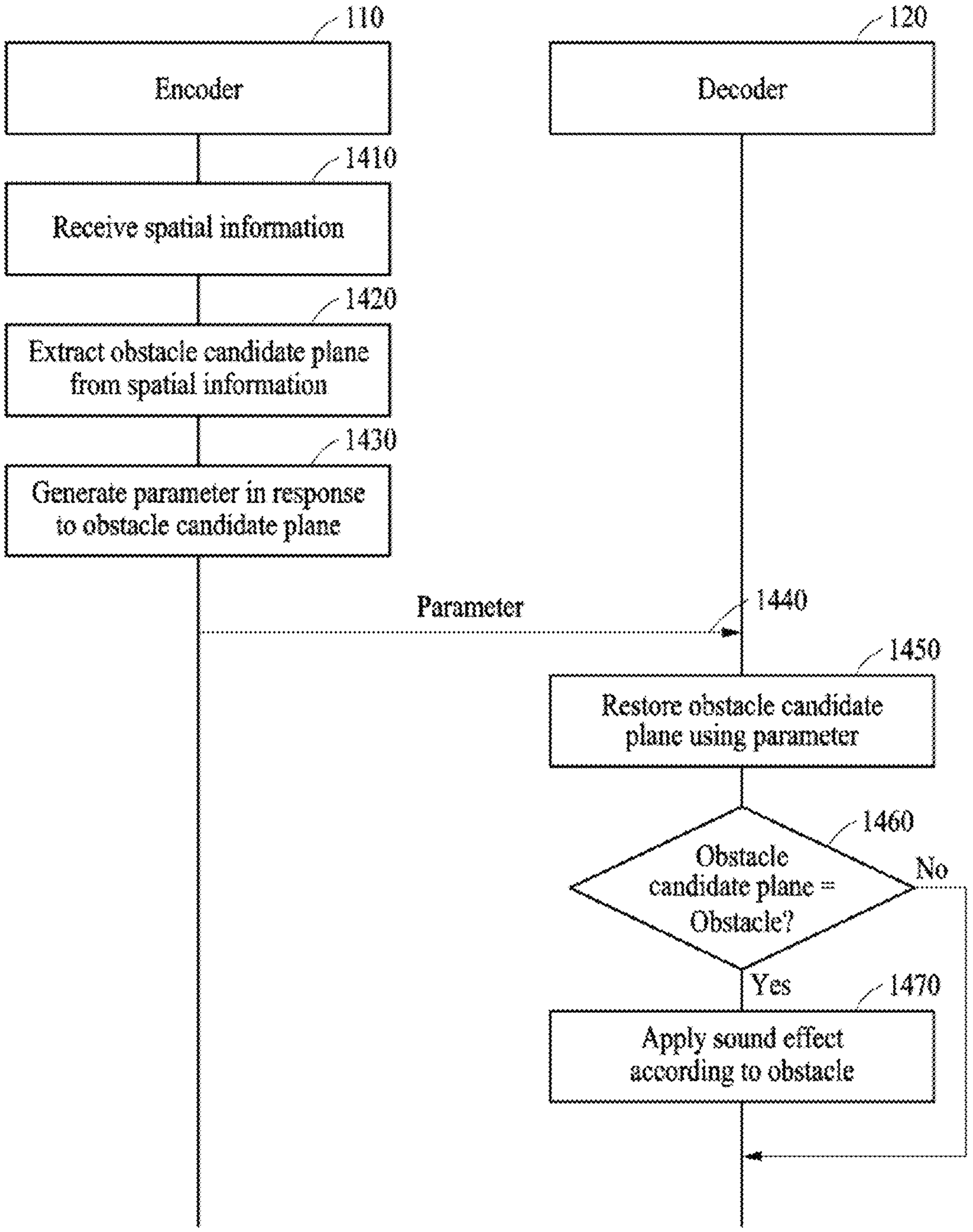
FIG. 14 is a diagram illustrating a method for processing an obstacle effect according to an example embodiment.

FIG. 14 is a diagram illustrating a method for processing an obstacle effect according to an example embodiment.

In operation 1410, a spatial information receiver 111 may receive spatial information of a space in which a user and a virtual sound source are positioned. In this case, the spatial information may include at least one of a structure of the space in which the user and the virtual sound source are positioned, coordinate information of a sound source, and material information of each surface representing an acoustic characteristic.

In operation 1420, the candidate plane extractor 112 may select a plane of an object that may become an obstacle in a sound propagation path between the sound source and the user from the spatial information received in operation 1420, and extract the plane as an obstacle candidate plane. In this case, the candidate plane extractor 112 may extract, as the obstacle candidate plane, a plane of an object having a concave shape in an orientation of a sound propagation path between the virtual sound source and the user from among objects included in the spatial information. In addition, the candidate plane extractor 112 may extract, as the obstacle candidate plane, a plane of an object that faces the sound source from among the objects included in the spatial information. When there are a plurality of planes of an object that may become the obstacle, the candidate plane extractor 112 may integrate planes that are considered to be on the same plane of the object that may become the obstacle, and extract the integrated planes as one obstacle candidate plane.

In operation 1430, the parameter generator 113 may generate a parameter for the obstacle candidate plane extracted in operation 1420. In this case, the parameter generator 113 may generate a parameter including material and transmission information of each of objects that may become the obstacle.

In operation 1440, the parameter generator 113 may transmit, to the decoder 120, the parameter generated in operation 1430.

In operation 1450, the obstacle plane search unit 121 may restore the obstacle candidate plane from the parameter received in operation 1440.

In operation 1460, the obstacle plane search unit 121 may determine whether the obstacle candidate plane restored in operation 1450 is an obstacle related to a path between a position of the virtual sound source and a position of the user. When it is determined that the obstacle candidate plane is the obstacle, the obstacle effect processor 122 may perform operation 1740. When it is determined that the obstacle candidate plane is not the obstacle, to the obstacle effect processor 122 may terminate an operation without applying a sound effect according to the obstacle.

In operation 1470, the obstacle effect processor 122 may apply the sound effect according to the obstacle to a decoded audio signal. In this case, the obstacle effect processor 122 may process an obstacle effect through one of a method for processing the obstacle effect considering only whether it is the obstacle, a method for processing the obstacle effect by applying an obstacle transmission, and a method for processing the obstacle effect by applying the obstacle transmission and diffraction.

According to example embodiments, an encoder may extract and transmit a candidate plane that may become the obstacle, and a decoder may determine whether it is the obstacle only with respect to the received candidate plane, thereby reducing time and resources used to determine whether it is the obstacle.

In addition, according to example embodiments, it is possible to optimize and transmit an amount of information on an obstacle plane in a virtual reality environment in which a listener is able to freely move, thereby minimizing resources required to transmit information and calculations required to process information.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The apparatus or method for processing an obstacle effect according to example to embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include all computer storage media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A method for processing an obstacle effect, the method comprising:

receiving a parameter for an obstacle candidate plane extracted from spatial information;

determining, in response to the parameter, whether the obstacle candidate plane is an obstacle related to a path between a position of a virtual sound source and a position of a user; and applying a sound effect according to the obstacle to an audio signal when the obstacle candidate plane is the obstacle, wherein the obstacle candidate plane is a plane of an object that may become the obstacle in a sound propagation path between the virtual sound source and the user, wherein the obstacle candidate plane is represented by reducing information of the object, and wherein the parameter includes at least one of a unique number of the obstacle candidate plane, coordinates representing a position and a shape of the obstacle candidate plane, or transmission information of the object.

2. The method of claim 1, wherein the applying of the sound effect comprises adjusting, in response to a preset value, a gain of a sound included in the audio signal.

3. The method of claim 1, wherein the applying of the sound effect comprises adjusting, in response to a transmission of the object determined as the obstacle, a gain of a sound included in the audio signal.

4. The method of claim 1, wherein the applying of the sound effect comprises identifying whether a diffraction path is included in the object determined as the obstacle, and applying a diffraction effect according to the diffraction path to the audio signal when the diffraction path is included.

5. A decoder of an obstacle effect processing system, the decoder comprising:

an obstacle plane search unit configured to receive a parameter for an obstacle candidate plane extracted from spatial information, and determine, in response to the parameter, whether the obstacle candidate plane is an obstacle related to a path between a position of a virtual sound source and a position of a user; and an obstacle effect processor configured to apply a sound effect according to the obstacle to an audio signal when the obstacle candidate plane is the obstacle, wherein the obstacle candidate plane is a plane of an object that may become the obstacle in a sound propagation path between the virtual sound source and the user, and wherein the obstacle candidate plane is represented by reducing information of the object, and wherein the parameter includes at least one of a unique number of the obstacle candidate plane, coordinates representing a position and a shape of the obstacle candidate plane, or transmission information of the object.

6. The decoder of claim 5, wherein the obstacle effect processor is configured to adjust, in response to a preset value, a gain of a sound included in the audio signal.

7. The decoder of claim 5, wherein the obstacle effect processor is configured to adjust, in response to a transmission of the object determined as the obstacle, a gain of a sound included in the audio signal.

8. The decoder of claim 5, wherein the obstacle effect processor is configured to identify whether a diffraction path is included in the object determined as the obstacle, and apply a diffraction effect according to the diffraction path to the audio signal when the diffraction path is included.

* * * * *